US008917846B1

(12) United States Patent
    Lachapelle

(10) Patent No.: US 8,917,846 B1
(45) Date of Patent: Dec. 23, 2014

(54) SYSTEM AND METHOD FOR CONTROLLING AUDIO IN A MULTI-USER MEETING

(75) Inventor: Serge Lachapelle, Vallentuna (SE)

(73) Assignee: Google Inc., Mountain View, CA (US)

( * ) Notice: Subject to any disclaimer, the term of this patent is extended or adjusted under 35 U.S.C. 154(b) by 390 days.

(21) Appl. No.: 13/361,279

(22) Filed: Jan. 30, 2012

(51) Int. Cl.
    *H04M 3/42*            (2006.01)
(52) U.S. Cl.
    USPC .................................................. 379/202.01
(58) Field of Classification Search
    USPC ............... 340/539.11, 825.49, 995.1, 309.16,
                          340/10.1; 379/202.01
    See application file for complete search history.

(56) References Cited

U.S. PATENT DOCUMENTS

| | | | |
|---|---|---|---|
| 6,628,767 B1 * | 9/2003 | Wellner et al. ........... | 379/202.01 |
| 6,741,188 B1 * | 5/2004 | Miller et al. ............... | 340/995.1 |
| 7,084,758 B1 * | 8/2006 | Cole ......................... | 340/539.11 |
| 7,272,498 B2 * | 9/2007 | Singh ............................ | 701/431 |
| 7,737,861 B2 * | 6/2010 | Lea et al. ....................... | 340/8.1 |
| 2004/0141605 A1 * | 7/2004 | Chen et al. ............... | 379/202.01 |
| 2004/0207522 A1 * | 10/2004 | McGee et al. ........... | 340/539.13 |
| 2006/0271281 A1 * | 11/2006 | Ahn et al. ..................... | 701/208 |
| 2009/0150064 A1 * | 6/2009 | Geelen ......................... | 701/201 |
| 2010/0184453 A1 * | 7/2010 | Ohki .......................... | 455/456.3 |

* cited by examiner

*Primary Examiner* — Mohammad Islam
(74) *Attorney, Agent, or Firm* — Remarck Law Group PLC

(57) ABSTRACT

A system and method for controlling audio in a multi-user meeting is provided. The method may include determining, using the one or more processing devices, that a group video conferencing device is associated with a multi-user video conference. The method may further include determining, using the one or more computing devices, whether a user associated with the multi-user video conference is located in a geographical location associated with the group video conferencing device. The method may also include, when the user is located in the geographic location of the group video conferencing device, automatically activating, using the one or more computing devices, a no-audio mode for a computing device associated with the user located in the geographical location.

27 Claims, 4 Drawing Sheets

SYSTEM AND METHOD FOR CONTROLLING AUDIO IN A MULTI-USER MEETING

TECHNICAL FIELD

This disclosure relates to multi-user meetings and, more particularly, to a system and method for controlling audio in a multi-user meeting.

BACKGROUND

Today's conference rooms often include groups of people congregated together in a meeting room, each with their own laptop. In some cases, the meeting room may be equipped with a group video conferencing device. A group video conferencing device often includes a dedicated computer having a central microphone and large speakers, which may enable the room to participate in a meeting (e.g. Google+ Hangouts). Frequently, we see these people join the same hangout in order to present slides, documents and/or use instant messaging. In many instances, multiple microphones may become active within the room, which may create an acoustic echoing, often referred to as "overhearing", as well a loud feedback often referred to as "howling". These events are generally extremely disruptive to the meeting. Realistically, the meeting can only proceed once every participant physically present in the room has muted their microphones and turned off the speakers on their respective systems. This can be irritating to the participants in the meeting room, as the feedback can be loud.

SUMMARY OF DISCLOSURE

In one implementation, a method, in accordance with this disclosure, may include determining, using the one or more processing devices, that a group video conferencing device is associated with a multi-user video conference. The method may further include determining, using the one or more computing devices, whether a user associated with the multi-user video conference is located in a geographical location associated with the group video conferencing device. The method may also include, when the user is located in the geographic location of the group video conferencing device, automatically activating, using the one or more computing devices, a no-audio mode for a computing device associated with the user located in the geographical location.

One or more of the following features may be included. In some embodiments, the method may include determining whether one or more additional users associated with the multi-user video conference are located in the geographical location and when the one or more additional users is located in the geographic location of the group video conferencing device, automatically activating, using the one or more computing devices, a no-audio mode for a computing device associated with the one or more additional users located in the geographical location. In some embodiments, determining whether the user associated with the multi-user video conference is located in the geographical location associated with the group video conferencing device may include, at least in part, determining that a calendar entry for the user indicates that the user is scheduled to be located in the geographical location associated with the group video conferencing device. In some embodiments, determining whether the user associated with the multi-user video conference is located in the geographical location associated with the group video conferencing device may include, at least in part, determining that the computing device associated with the user is located in the geographical location associated with the group video conferencing device. In some embodiments, determining that the computing device associated with the user is located in the geographical location may include, at least in part, global positioning systems, near-field communication, bar code scan in, radio frequency identification, Bluetooth, ultra-wide band, and Wi-Fi. In some embodiments, the multi-user video conference may include a plurality of users' computing devices located in one geographical location. In some embodiments, the multi-user video conference may be enabled, based upon, at least in part, a group video conferencing device. The method may further include disabling at least one of the microphone and the speaker associated with the user's computer.

In another implementation, a computer readable storage medium having a plurality of instructions stored thereon is provided. In some embodiments, the instructions, which when executed by a processor, cause the processor to perform one or more operations. Some operations may include determining that a group video conferencing device is associated with a multi-user video conference. Operations may further include determining whether a user associated with the multi-user video conference is located in a geographical location associated with the group video conferencing device. In some embodiments, when the user is located in the geographic location of the group video conferencing device, operations may further include automatically activating, using the one or more computing devices, a no-audio mode for a computing device associated with the user located in the geographical location.

One or more of the following features may be included. In some embodiments, operations may further include determining whether one or more additional users associated with the multi-user video conference are located in the geographical location. When the one or more additional users is located in the geographic location of the group video conferencing device, operations may further include automatically activating a no-audio mode for a computing device associated with the one or more additional users located in the geographical location. In some embodiments, determining whether the user associated with the multi-user video conference is located in the geographical location associated with the group video conferencing device may include, at least in part, determining that a calendar entry for the user indicates that the user is scheduled to be located in the geographical location associated with the group video conferencing device. In some embodiments, determining whether the user associated with the multi-user video conference is located in the geographical location associated with the group video conferencing device may include, at least in part, determining that the computing device associated with the user is located in the geographical location associated with the group video conferencing device. In some embodiments, determining that the computing device associated with the user is located in the geographical location may include, at least in part, global positioning systems, near-field communication, bar code scan in, radio frequency identification, Bluetooth, ultra-wide band, and Wi-Fi. In some embodiments, the multi-user video conference may include a plurality of users' computing devices located in one geographical location. In some embodiments, the multi-user video conference may be enabled, based upon, at least in part, a group video conferencing device. Operations may further include disabling at least one of the microphone and the speaker associated with the user's computer.

In another implementation, a system is provided. In some embodiments, the system may include one or more processors configured to determine that a group video conferencing device is associated with a multi-user video conference, the one or more processors being further configured to determine whether a user associated with the multi-user video conference is located in a geographical location associated with the group video conferencing device, when the user is located in the geographic location of the group video conferencing device, the one or more processors being further configured to automatically activate a no-audio mode for a computing device associated with the user located in the geographical location.

One or more of the following features may be included. In some embodiments, the one or more processors may be further configured to determine whether one or more additional users associated with the multi-user video conference are located in the geographical location. In some embodiments, when the one or more additional users is located in the geographic location of the group video conferencing device, the one or more processors may be further configured to automatically activate a no-audio mode for a computing device associated with the one or more additional users located in the geographical location. In some embodiments, determining whether the user associated with the multi-user video conference is located in the geographical location associated with the group video conferencing device may include, at least in part, one or more processors configured to determine that a calendar entry for the user indicates that the user is scheduled to be located in the geographical location associated with the group video conferencing device. In some embodiments, determining whether the user associated with the multi-user video conference is located in the geographical location associated with the group video conferencing device may include, at least in part, one or more processors configured to determine that the computing device associated with the user is located in the geographical location associated with the group video conferencing device. In some embodiments, determining that the computing device associated with the user is located in the geographical location may include, at least in part, global positioning systems, near-field communication, bar code scan in, radio frequency identification, Bluetooth, ultra-wide band, and Wi-Fi. In some embodiments, the multi-user video conference may include a plurality of users' computing devices located in one geographical location. In some embodiments, the multi-user video conference may be enabled, based upon, at least in part, a group video conferencing device. In some embodiments, the one or more processors may be further configured to disable at least one of the microphone and the speaker associated with the user's computer.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EMBODIMENTS

Overview

Embodiments described herein are directed towards a novel methodology for controlling audio in a multi-user meeting. When multiple users are present in the same meeting room, each with their own computer having its own microphone and speaker system, the result is often disruptive as an acoustic echoing effect may occur when more than one microphone is active.

Often times, when one particular meeting room is being used that room may be equipped with a group video conferencing device. A group video conferencing device, as used herein, may refer to a dedicated computing device having a central microphone and large speakers that may enable the members of the room to participate in a multi-user meeting (e.g. a GOOGLE+ hangouts type setting). Although, the present disclosure focuses primarily upon video conferencing it should be noted that the teachings of the present disclosure could be extended to other types of conferencing, e.g. audio conferencing, etc.

Embodiments described herein may allow the participants of the multi-user meeting to enter a no-audio mode on their devices. A participant may enter the no-audio mode manually using an option on an interstitial page prior entering the video conference. Additionally and/or alternatively, the no audio mode may be entered automatically based upon determining that a particular user or users are present in a room equipped with a group video conferencing like device. This determination that the user is in a room with active video conferencing may be made in any number of ways, e.g., using the users' calendar entries, using a GPS based location sensor, etc.

System Overview

Figure 1:
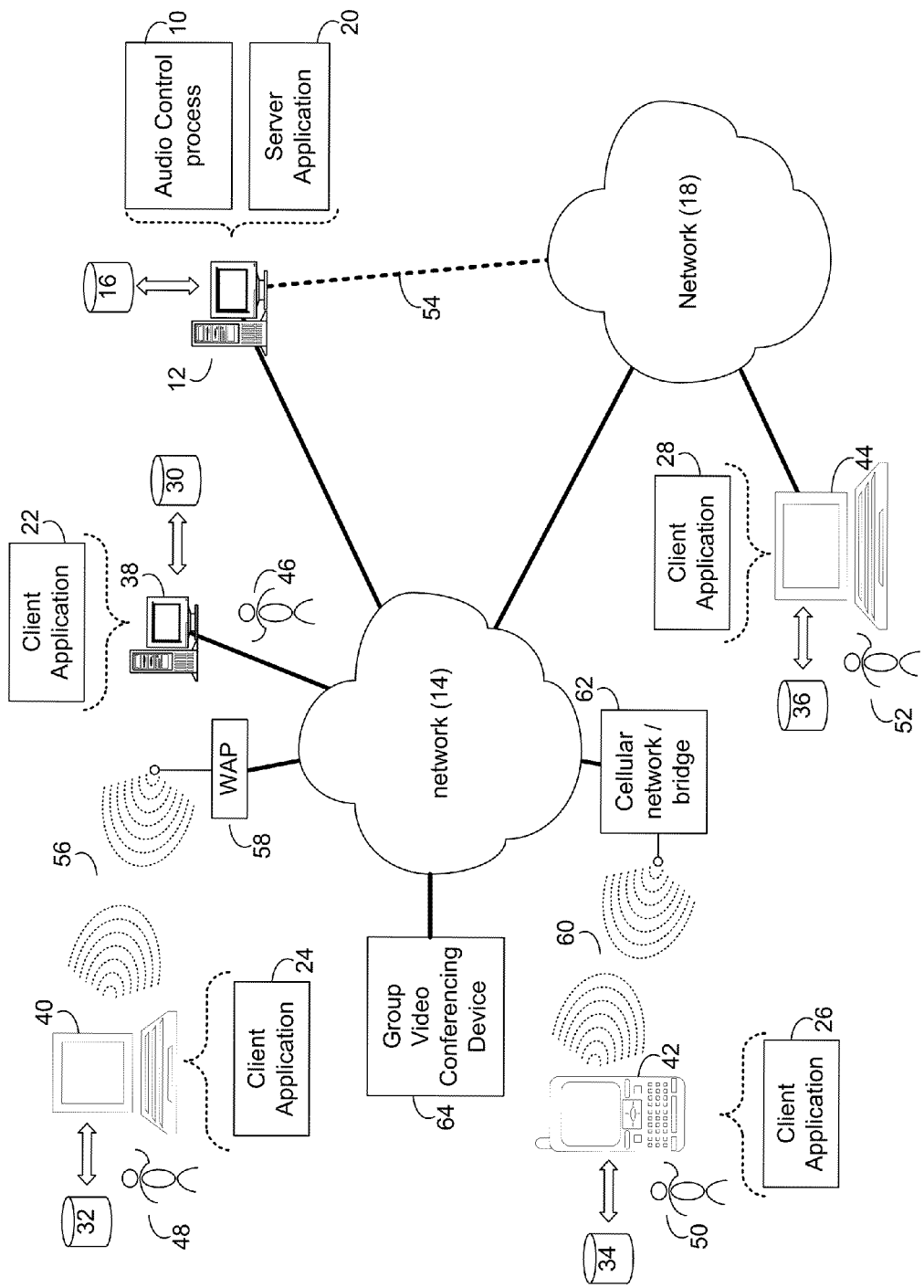
FIG. 1 is a diagrammatic view of an audio control process in accordance with an embodiment of the present disclosure.
Figure 2:
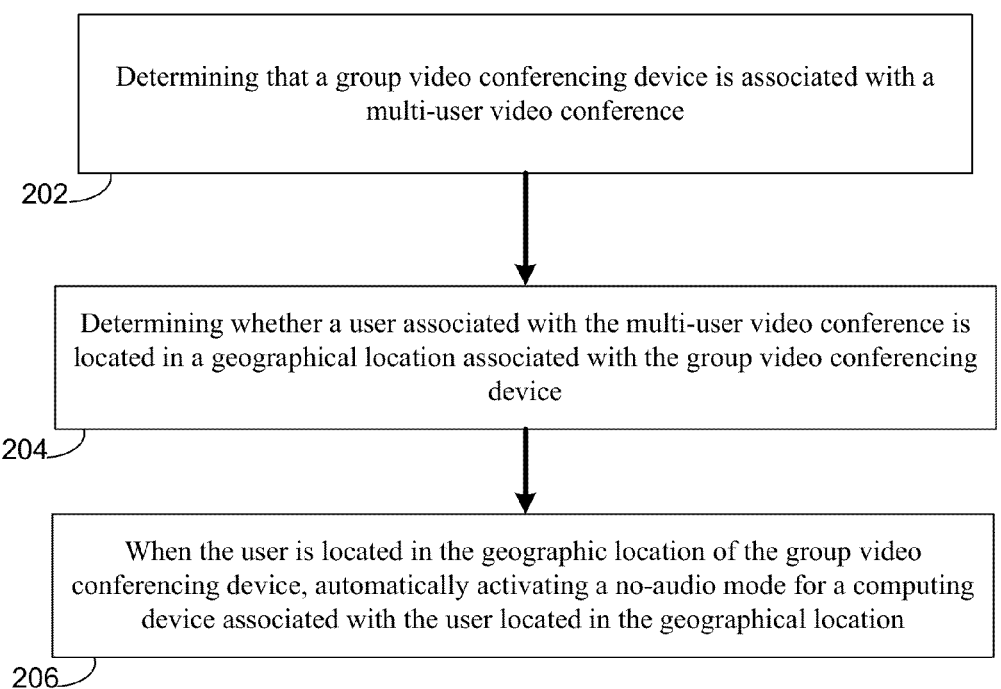
FIG. 2 is a flowchart of an audio control process in accordance with an embodiment of the present disclosure.

Referring to FIGS. 1-2, there is shown a audio control process 10 that may reside on and may be executed by computer 12, which may be connected to network 14 (e.g., the Internet or a local area network). Server application 20 may include some or all of the elements of audio control process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multi-processor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail, audio control process 10 may include determining (202), using the one or more processing devices, that a group video conferencing device is associated with a multi-user video conference. The method may further include determining (204), using the one or more computing devices, whether a user associated with the multi-user video conference is located in a geographical location associated with the group video conferencing device. The method may also include, when the user is located in the geographic location of the group video conferencing device, automatically activating (206), using the one or more computing devices, a no-audio mode for a computing device associated with the user located in the geographical location.

The instruction sets and subroutines of audio control process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Audio control process 10 may be accessed via and/or executed by client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, a television with one or more processors embedded therein or coupled thereto, laptop computer 40, smart phone 42, notebook computer 44, a server (not shown), a data-enabled, cellular telephone (not shown), and a dedicated network device (not shown).

One or more of client applications 22, 24, 26, 28 may be configured to effectuate some or all of the functionality of audio control process 10. Accordingly, audio control process 10 may be a purely server-side application, a purely client-side application, or a hybrid server-side/client-side application that is cooperatively executed by one or more of client applications 22, 24, 26, 28 and audio control process 10.

Users 46, 48, 50, 52 may access computer 12 and audio control process 10 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular/network bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection.

Client electronic devices 38, 40, 42, 44 may each execute an operating system, examples of which may include but are not limited to Apple iOS™, Microsoft Windows™, Android™, Redhat Linux™, Apple Mac OS™, or a custom operating system.

As discussed herein, a group video conferencing device 64 may be operatively connected to one or more networks associated with audio control process 10. In this way, group video conferencing device 64 may be configured to communicate with one or more server computers, e.g. server computer 12. In some embodiments, group video conferencing device 64 may be located in a particular geographical location (e.g. a conference room) having a plurality of computing devices located therein (e.g. client electronic devices 38, 40, 42, and 44). In one particular embodiment, a plurality of laptop computers may be present within the conference room and may be in communication with the group video conferencing device 64. Some exemplary group video conferencing devices 64 include the HDX series available from Polycom, Inc. and the 8000 MXP available from Tandberg, Inc.

Example Audio Control Process

Figure 3:
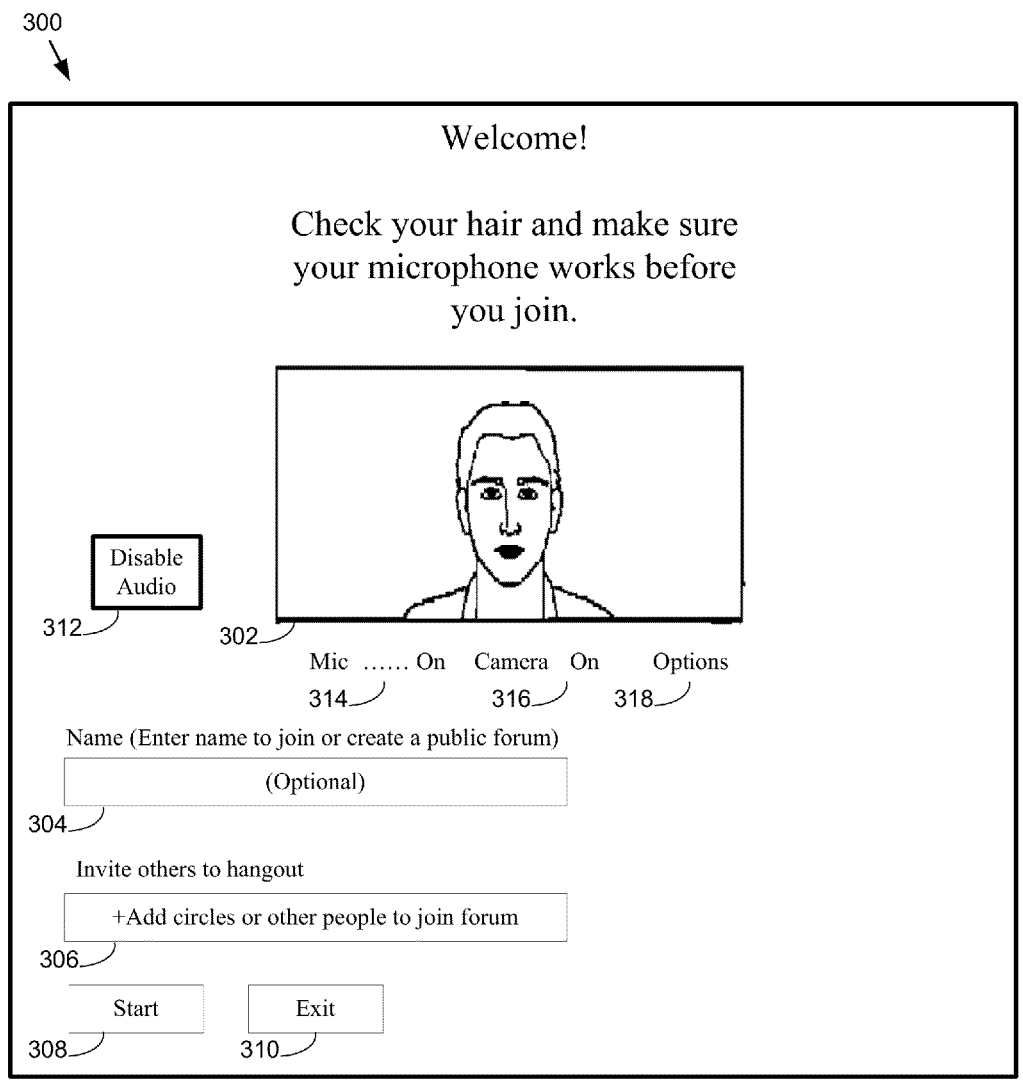
FIG. 3 is a diagram depicting one example of an audio control process in accordance with an embodiment of the present disclosure.

Referring now to FIG. 3, a diagram depicting an example of an interstitial webpage 300 consistent with the audio control process described herein is provided. In some embodiments, interstitial webpage 300 may be configured to allow a user to adjust certain settings prior to entering a multi-user video conference. In some embodiments, these settings may include but are not limited to, audio and video settings. Audio control process may be configured to provide on interstitial webpage 300 an option for the user to disable one or more of a microphone and a speaker associated with a user's computer prior to entering the multi-user video conference.

The phrase "interstitial webpage" as used herein, encompasses its plain and ordinary meaning, including, but not limited to, a webpage displayed before or after an expected content page. For the purposes of the present disclosure an interstitial webpage may include "green room" functionality, which may allow the user to direct the camera as desired, adjust his/her microphone, etc., prior to entering a video conference.

As shown in FIG. 3, interstitial webpage 300 may include a user interface having a video display 302, which may be configured to allow a user to review their physical appearance (e.g., via a video or still image) and the current audio and video settings that will be viewable by the other members of the multi-user video conference. In some embodiments, the user may be given the option of entering their name prior to joining and/or creating a public forum using identification field 304. Additionally and/or alternatively, interstitial webpage 300 may include invitation field 306, which may allow a user to enter the names or groups of individuals that the user wishes to invite to the forum. Interstitial webpage 300 may further include start button 308 and exit button 310, which when selected may allow the user to enter or exit the multi-user video conference. Interstitial webpage 300 may further include disable audio button 312, which may allow the user to disable at least one of a microphone and a speaker associated with the user's computer. Interstitial webpage 300 may also include audio indicator icon 314 and video indicator icon 316. These icons may indicate to the user whether or not the audio and video features associated with the user are activated and functioning properly.

In some embodiments, interstitial webpage 300 may further include settings feature 318, which may allow the user to adjust one or more settings prior to or during participation in the multi-user video conference. The user may access a settings page through settings feature 318 in order to ensure that the user's camera, microphone, and/or speakers are functioning properly. In some embodiments, the settings page may allow the user to troubleshoot various issues with his/her A/V components. Numerous additional features, including but not limited to, the ability to enable echo cancellation, report quality statistics, etc. may also be provided through settings page.

In some embodiments, the multi-user video conference may include a plurality of users located in one geographical location, each of the users having their own individual computing device. In one particular example, the audio control process described herein may be used in a conference room having a number of participants located therein. In some embodiments, the multi-user video conference may include a group video conferencing device included in the particular location (e.g. conference room). As discussed above, the audio control process described herein may allow for the disabling of the microphone and the speaker associated with the user's computer via interstitial page 300.

In some embodiments, audio control process 10 may utilize a location-based analysis in order to determine whether to enable a no-audio mode on a particular user's computer. Accordingly, audio control process 10 may include determining (202), using the one or more processing devices, that a group video conferencing device is associated with a multi-user video conference. The method may further include determining (204), using the one or more computing devices, whether a user associated with the multi-user video conference is located in a geographical location associated with the group video conferencing device. The method may also include, when the user is located in the geographic location of the group video conferencing device, automatically activating (206), using the one or more computing devices, a no-audio mode for a computing device associated with the user located in the geographical location.

In some embodiments, audio control process may determine (202) that a group video conferencing device is associated with a multi-user video conference. This may occur using a number of different techniques. For example, audio control process 10 may be configured to determine the location of the multi-user video conference, e.g., the particular conference room. Once the location of the multi-user video conference has been determined, audio control process 10 may further determine whether or not that particular conference room is equipped with a group video conferencing device. In this way, audio control process 10 may analyze one or more applications to determine the equipment present in that particular conference room. More specifically, audio control process 10 may determine if a group video conferencing device is present.

In some embodiments, audio control process 10 may determine (204) whether a user associated with the multi-user video conference is located in a geographical location associated with the group video conferencing device. This may occur using a number of different techniques.

For example, in one embodiment, audio control process 10 may analyze one or more calendar entries in order to determine whether a particular user will be present in a geographical location having a group video conferencing device. In some embodiments, this analysis may be manually activated by the user (e.g., activated on a user interface such as interstitial page 300), or alternatively may occur automatically at any point prior to participation in the multi-user video conference. In some embodiments, the calendar may be any suitable calendar, e.g. shared online calendars, etc.

Additionally and/or alternatively, audio control process 10 may determine (204) whether the user associated with the multi-user video conference is located in a geographical location associated with a group video conferencing device by determining that the user's computing device is located in the geographical location associated with the group video conferencing device. Accordingly, audio control process 10 may utilize one or more location based services in order to determine the location of the user's computer. Some location based services may include, but are not limited to, global positioning systems (GPS), near-field communication (NFC), bar code scan in, radio frequency identification (RFID), Bluetooth, ultra-wide band, and Wi-Fi. In this way, audio control process 10 may be used to establish the location of the user and/or the user's computing device (e.g., a particular conference room within a building). Determining that the user's computing device is located in the geographical location associated with the group video conferencing device may take many forms. For example, in the case of GPS coordinates, the user's device location may be directly determined. Additionally and/or alternatively, for NFC, the user may, for example, tap his or her phone on a "scan in" NFC reader to indicate location in a room. NFC readers may also detect the user device without any action on the part of the user. In some embodiments, the user device may determine its location by knowledge of the accessible or visible WiFi networks. The location of the user device may then be sent to a central server. In the case where something in the room is determining the location of the device (e.g., checking in with an NFC-enabled device), the device in the room doing the detecting of the user device may send data to the server indicating that the user device is in the room.

In some embodiments, when the user is located in the geographic location of the group video conferencing device, audio control process 10 may be configured to automatically activate (206) a no-audio mode for a user's computing device associated with the user located in the geographical location. The no-audio mode may include disabling the speakers and/or microphone associated with the user's computing device.

As discussed herein, in some embodiments, the multi-user video conference may include a plurality of users' computing devices located in one geographical location. The multi-user video conference may be enabled, based upon, at least in part, a group video conferencing device.

In some embodiments, audio control process 10 may be configured to determine whether one or more additional users associated with the multi-user video conference are located in the geographical location. Accordingly, if one or more additional users are located in the geographic location of the group video conferencing device, audio control process 10 may be configured to automatically activate a no-audio mode for the computing devices associated with those additional users as well.

In some embodiments, the audio control process described herein may be implemented a standalone application, or alternatively, as an applet or plug-in configured to execute within a larger program. For example, in some embodiments, audio control process 10 may be incorporated within a social networking program that may be configured to allow a plurality of users to participate in a live-chat setting.

Additionally and/or alternatively, any or all of the aspects of audio control process 10 may be configured to operate in a particular room having a number of participants. For example, users A, B, and C may be present in a room X having no group video conferencing device. In this particular example, User B may join a multi-user video conference from his/her laptop computing device. User A and user C may follow the multi-user video conference from user B's laptop computing device. In the event that user C wants to present one or more demonstrations, user C may then join the multi-user video conference. In this particular example, user B's laptop computing device may be configured for use as the group video conferencing device. It should be noted that this example is not limited to laptop computing devices as any computing device may be used without departing from the scope of this disclosure.

Figure 4:
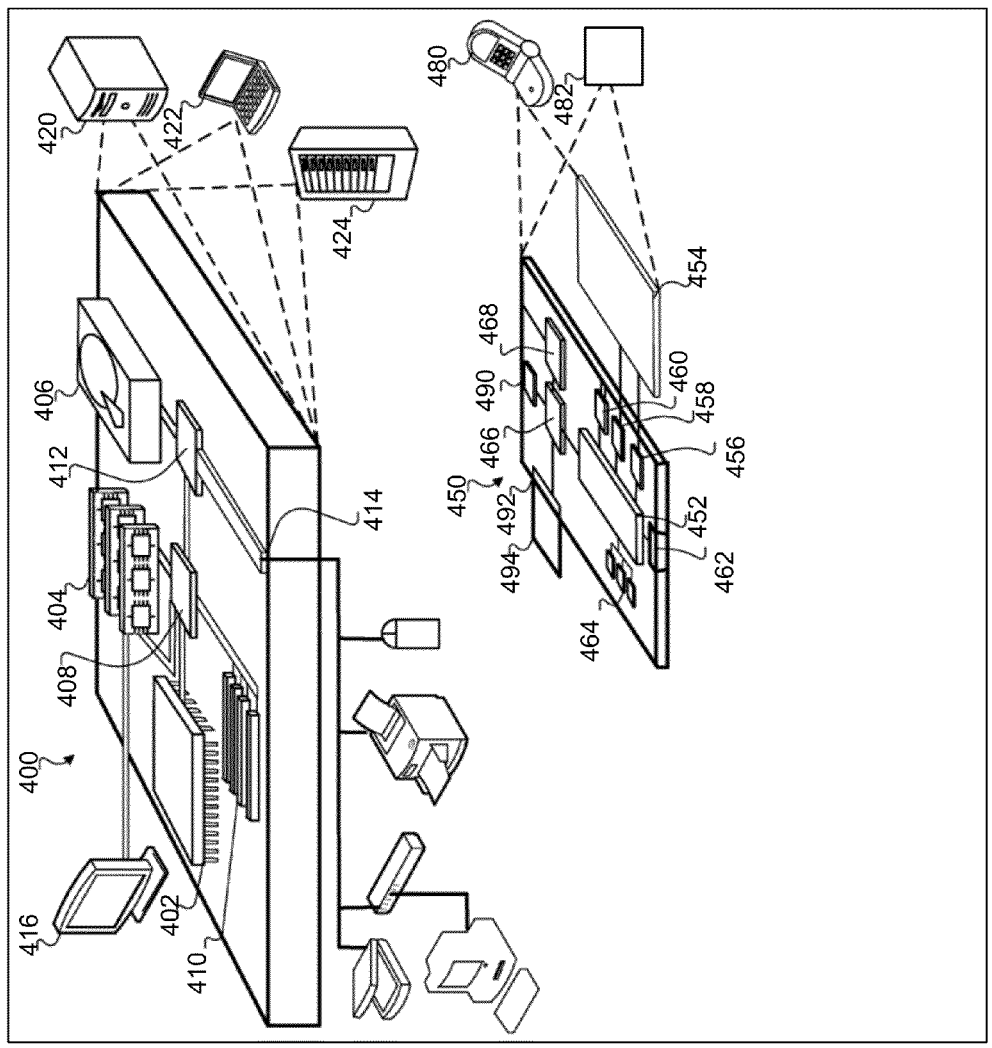
FIG. 4 is a diagrammatic view of a computing device that may be used in accordance with an embodiment of the present disclosure.

Referring now to FIG. 4, an example of a generic computer device 400 and a generic mobile computer device 450, which may be used with the techniques described here is provided. Computing device 400 is intended to represent various forms of digital computers, such as tablet computers, laptops, desktops, workstations, personal digital assistants, servers, blade servers, mainframes, and other appropriate computers. In some embodiments, computing device 450 can include various forms of mobile devices, such as personal digital assistants, cellular telephones, smartphones, and other similar computing devices. Computing device 450 and/or computing device 400 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 400 may include processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, may be interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

Memory 404 may store information within the computing device 400. In one implementation, the memory 404 may be a volatile memory unit or units. In another implementation, the memory 404 may be a non-volatile memory unit or units. The memory 404 may also be another form of computer-readable medium, such as a magnetic or optical disk.

Storage device 406 may be capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

High speed controller 408 may manage bandwidth-intensive operations for the computing device 400, while the low speed controller 412 may manage lower bandwidth-intensive operations. Such allocation of functions is exemplary only. In one implementation, the high-speed controller 408 may be coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 may include a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, may be interconnected using various buses, and several of the components may be mounted on a common motherboard or in other manners as appropriate.

Processor 452 may execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

In some embodiments, processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

In some embodiments, memory 464 may store information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

Computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method, executing on one or more computing devices, said method comprising:
   determining, using the one or more processing devices, that a group video conferencing device is associated with a multi-user video conference;
   determining, using the one or more computing devices, whether a user associated with the multi-user video conference is located in a geographical location associated with the group video conferencing device; and
   when the user is located in the geographic location of the group video conferencing device, automatically activating, using the one or more computing devices, a no-audio mode for a computing device associated with the user located in the geographical location.

2. The computer-implemented method of claim 1, further comprising:
determining whether one or more additional users associated with the multi-user video conference are located in the geographical location; and
when the one or more additional users is located in the geographic location of the group video conferencing device, automatically activating, using the one or more computing devices, a no-audio mode for a computing device associated with the one or more additional users located in the geographical location.

3. The computer-implemented method of claim 1, wherein determining whether the user associated with the multi-user video conference is located in the geographical location associated with the group video conferencing device comprises, at least in part, determining that a calendar entry for the user indicates that the user is scheduled to be located in the geographical location associated with the group video conferencing device.

4. The computer-implemented method of claim 1, wherein determining whether the user associated with the multi-user video conference is located in the geographical location associated with the group video conferencing device comprises, at least in part, determining that the computing device associated with the user is located in the geographical location associated with the group video conferencing device.

5. The computer-implemented method of claim 4, wherein determining that the computing device associated with the user is located in the geographical location comprises, at least in part, global positioning systems, near-field communication, bar code scan in, radio frequency identification, Bluetooth, ultra-wide band, and Wi-Fi.

6. The computer-implemented method of claim 1, wherein the multi-user video conference includes a plurality of users' computing devices located in one geographical location.

7. The computer-implemented method of claim 1, wherein the multi-user video conference is enabled, based upon, at least in part, a group video conferencing device.

8. The computer-implemented method of claim 1, further comprising:
disabling at least one of the microphone and the speaker associated with the user's computer.

9. The computer-implemented method of claim 1, further comprising:
determining, using the one of more computing devices, the geographical location associated with the group video conferencing device.

10. A computer program product residing on a non-transitory computer readable storage medium having a plurality of instructions stored thereon, which when executed by a processor, cause the processor to perform operations comprising:
determining that a group video conferencing device is associated with a multi-user video conference;
determining whether a user associated with the multi-user video conference is located in a geographical location associated with the group video conferencing device; and
when the user is located in the geographic location of the group video conferencing device, automatically activating a no-audio mode for a computing device associated with the user located in the geographical location.

11. The computer program product of claim 10, wherein operations further comprise:
determining whether one or more additional users associated with the multi-user video conference are located in the geographical location; and
when the one or more additional users is located in the geographic location of the group video conferencing device, automatically activating, using the one or more computing devices, a no-audio mode for a computing device associated with the one or more additional users located in the geographical location.

12. The computer program product of claim 10, wherein determining whether the user associated with the multi-user video conference is located in the geographical location associated with the group video conferencing device comprises, at least in part, determining that a calendar entry for the user indicates that the user is scheduled to be located in the geographical location associated with the group video conferencing device.

13. The computer program product of claim 10, wherein determining whether the user associated with the multi-user video conference is located in the geographical location associated with the group video conferencing device comprises, at least in part, determining that the computing device associated with the user is located in the geographical location associated with the group video conferencing device.

14. The computer program product of claim 13, wherein determining that the computing device associated with the user is located in the geographical location comprises, at least in part, global positioning systems, near-field communication, bar code scan in, radio frequency identification, Bluetooth, ultra-wide band, and Wi-Fi.

15. The computer program product of claim 10, wherein the multi-user video conference includes a plurality of users' computing devices located in one geographical location.

16. The computer program product of claim 10, wherein the multi-user video conference is enabled, based upon, at least in part, a group video conferencing device.

17. The computer program product of claim 10, wherein operations further comprise:
disabling at least one of the microphone and the speaker associated with the user's computer.

18. The computer program product of claim 10, wherein operations further comprise:
determining, using the one of more computing devices, the geographical location associated with the group video conferencing device.

19. A computing system comprising:
one or more processors configured to determine that a group video conferencing device is associated with a multi-user video conference, the one or more processors being further configured to determine whether a user associated with the multi-user video conference is located in a geographical location associated with the group video conferencing device, when the user is located in the geographic location of the group video conferencing device, the one or more processors being further configured to automatically activate a no-audio mode for a computing device associated with the user located in the geographical location.

20. The computing system of claim 19, wherein the one or more processors are further configured to determine whether one or more additional users associated with the multi-user video conference are located in the geographical location, when the one or more additional users is located in the geographic location of the group video conferencing device, the one or more processors being further configured to automatically activate a no-audio mode for a computing device associated with the one or more additional users located in the geographical location.

21. The computing system of claim 19, wherein determining whether the user associated with the multi-user video conference is located in the geographical location associated with the group video conferencing device comprises, at least in part, one or more processors configured to determine that a calendar entry for the user indicates that the user is scheduled to be located in the geographical location associated with the group video conferencing device.

22. The computing system of claim 19, wherein determining whether the user associated with the multi-user video conference is located in the geographical location associated with the group video conferencing device comprises, at least in part, one or more processors configured to determine that the computing device associated with the user is located in the geographical location associated with the group video conferencing device.

23. The computing system of claim 22, wherein determining that the computing device associated with the user is located in the geographical location comprises, at least in part, global positioning systems, near-field communication, bar code scan in, radio frequency identification, Bluetooth, ultra-wide band, and Wi-Fi.

24. The computing system of claim 19, wherein the multi-user video conference includes a plurality of users' computing devices located in one geographical location.

25. The computing system of claim 19, wherein the multi-user video conference is enabled, based upon, at least in part, a group video conferencing device.

26. The computing system of claim 19, wherein the one or more processors are further configured to disable at least one of the microphone and the speaker associated with the user's computer.

27. The computing system of claim 19, wherein the one or more processors are further configured to determine the geographical location associated with the group video conferencing device.

* * * * *